United States Patent
Choi et al.

(10) Patent No.: US 9,001,027 B2
(45) Date of Patent: Apr. 7, 2015

(54) ELECTROWETTING DISPLAY DEVICE INCLUDING RESET SIGNAL LINES THAT INCLUDE NOTCH ELECTRODES AND DRIVING METHOD THEREOF

(75) Inventors: Uk Chul Choi, Cheonan-si (KR); Cheol Woo Park, Suwon-si (KR); Hyun Sik Hwang, Hwaseong-si (KR); Yong Jun Jang, Yongin-si (KR)

(73) Assignee: Amazon Technologies, Inc., Reno, NV (US)

( * ) Notice: Subject to any disclaimer, the term of this patent is extended or adjusted under 35 U.S.C. 154(b) by 141 days.

(21) Appl. No.: 13/554,794

(22) Filed: Jul. 20, 2012

(65) Prior Publication Data

US 2013/0222355 A1 Aug. 29, 2013

(30) Foreign Application Priority Data

Feb. 23, 2012 (KR) ........................ 10-2012-0018481

(51) Int. Cl.
*G09G 3/34* (2006.01)
(52) U.S. Cl.
CPC .......... *G09G 3/344* (2013.01); *G09G 2310/068* (2013.01); *G09G 3/3446* (2013.01)
(58) Field of Classification Search
CPC ................ G09G 3/344; G09G 3/3446; G09G 2310/068; G02F 1/167
USPC ........................................................ 345/107
See application file for complete search history.

(56) References Cited

U.S. PATENT DOCUMENTS

| | | | |
|---|---|---|---|
| 7,132,614 B2 | 11/2006 | Beerling | |
| 7,268,310 B2 | 9/2007 | Beerling | |
| 7,548,363 B2 | 6/2009 | Hayes et al. | |
| 7,636,187 B2 * | 12/2009 | Morozumi et al. | 359/228 |
| 7,800,816 B2 | 9/2010 | Hayes et al. | |
| 7,872,790 B2 * | 1/2011 | Steckl et al. | 359/253 |
| 2008/0165120 A1 | 7/2008 | Johnson | |
| 2008/0224970 A1 * | 9/2008 | Van Den Biggelaar et al. | 345/84 |
| 2008/0264506 A1 | 10/2008 | Beerling et al. | |
| 2009/0027317 A1 * | 1/2009 | Cheng et al. | 345/84 |
| 2009/0195850 A1 | 8/2009 | Takahashi | |
| 2009/0316253 A1 | 12/2009 | Fairley et al. | |
| 2010/0225986 A1 | 9/2010 | Missbach | |
| 2012/0307347 A1 * | 12/2012 | Clapp et al. | 359/296 |
| 2012/0326956 A1 * | 12/2012 | Ueki et al. | 345/107 |

FOREIGN PATENT DOCUMENTS

| WO | WO2011075720 | * | 6/2011 |
|---|---|---|---|
| WO | WO2011111263 | * | 9/2011 |

* cited by examiner

*Primary Examiner* — Chanh D. Nguyen
*Assistant Examiner* — Ram Mistry
(74) *Attorney, Agent, or Firm* — Lee & Hayes, PLLC

(57) ABSTRACT

The present invention applies the voltage that is swung to the notch electrode of each pixel of the electrowetting display device to reset the oil layer to not backflow such that an additional element is not disposed in the pixel, thereby increasing the aperture ratio of the pixel. Also, the reset signal generator generating and applying the reset signal is disposed inside the electrowetting display device such that additional wiring may not be disposed in the outer part of the panel.

15 Claims, 13 Drawing Sheets

White + Reset

Black + Reset

ELECTROWETTING DISPLAY DEVICE INCLUDING RESET SIGNAL LINES THAT INCLUDE NOTCH ELECTRODES AND DRIVING METHOD THEREOF

CROSS-REFERENCE TO RELATED APPLICATION

This application claims priority from and the benefit of Korean Patent Application No. 10-2012-0018481, filed on Feb. 23, 2012, which is incorporated herein by reference for all purposes as if fully set forth herein.

BACKGROUND OF THE INVENTION

1. Field of the Invention

Exemplary embodiments of the present invention relate to an electrowetting display device and a driving method thereof.

2. Discussion of the Background

Currently popular flat panel displays include a liquid crystal display (LCD), a plasma display device (PDP), an organic light emitting display (OLED), a field effect display (FED), an electrophoretic display (EPD), and an electrowetting display device (EWD).

Among them, the electrowetting display device displays a gray color in pixels by controlling a movement of oil in water as an electrolyte. The electrowetting display device is a display device of a shutter type that does not use a polarizer such that transmittance is good and a gamma characteristic according to a voltage is represented as linear. Also, the electrowetting display device may be formed of a reflective type or a transmissive type such that it may be manufactured with a shape that is suitable for an environment in which the display device is used, and a backlight may not be used in the reflective type.

The electrowetting display device uses a process for forming a TFT like other flat panel displays such as a liquid crystal display, however a filling process of filling the water and the oil is required.

Also, the electrowetting display device should periodically apply a reset signal to maintain a state of the water or the oil and to not generate a backflow.

In a conventional electrowetting display device, an additional element such as a diode is required to apply the reset signal to the pixel or wiring should be additionally formed at an outer portion of the panel to transmit the reset signal applied from outside of the panel. When the additional element is formed in the pixel, the aperture ratio of the pixel is decreased, and when the wiring is added on the outer portion of the panel, sufficient space may not be available for each wire because of the number of wires, such that signal interference may be generated.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide an electrowetting display device capable of undergoing a reset operation without an additional element and a driving method thereof.

Additional features of the invention will be set forth in the description which follows, and in part will be apparent from the description, or may be learned by practice of the invention.

An electrowetting display device according to an exemplary embodiment of the present invention includes: a lower substrate; a pixel electrode disposed on the lower substrate; a notch electrode spaced apart from the pixel electrode by an interval; a water-repellent layer covering the pixel electrode and the notch electrode; a partition disposed on the water-repellent layer; an oil layer disposed on the water-repellent layer between partitions; an upper substrate disposed on the lower substrate; and a common electrode disposed between the lower substrate and the upper substrate, wherein the notch electrode is applied with a voltage which swings between a high voltage and a low voltage.

A method of driving an electrowetting display device including a plurality of gate lines, a plurality of reset signal lines including notch electrodes, a plurality of data lines, a plurality of pixels connected to the plurality of gate lines, a plurality of reset signal lines, a plurality of partitions, and an oil layer according to an exemplary embodiment of the present invention includes: sequentially applying a gate-on voltage to the plurality of gate lines; applying a data voltage to the plurality of data lines; and applying a reset signal to the plurality of reset signal lines, wherein the reset signal has a voltage which swings between a high voltage and a low voltage.

An electrowetting display device according to another exemplary embodiment of the present invention includes: a plurality of gate lines; a plurality of reset signal lines comprising notch electrodes; a plurality of data lines; a plurality of pixels connected to the plurality of gate lines; a plurality of partitions; and an oil layer, wherein at least one reset signal line is configured to receive a reset signal having a voltage which swings between a high voltage and a low voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
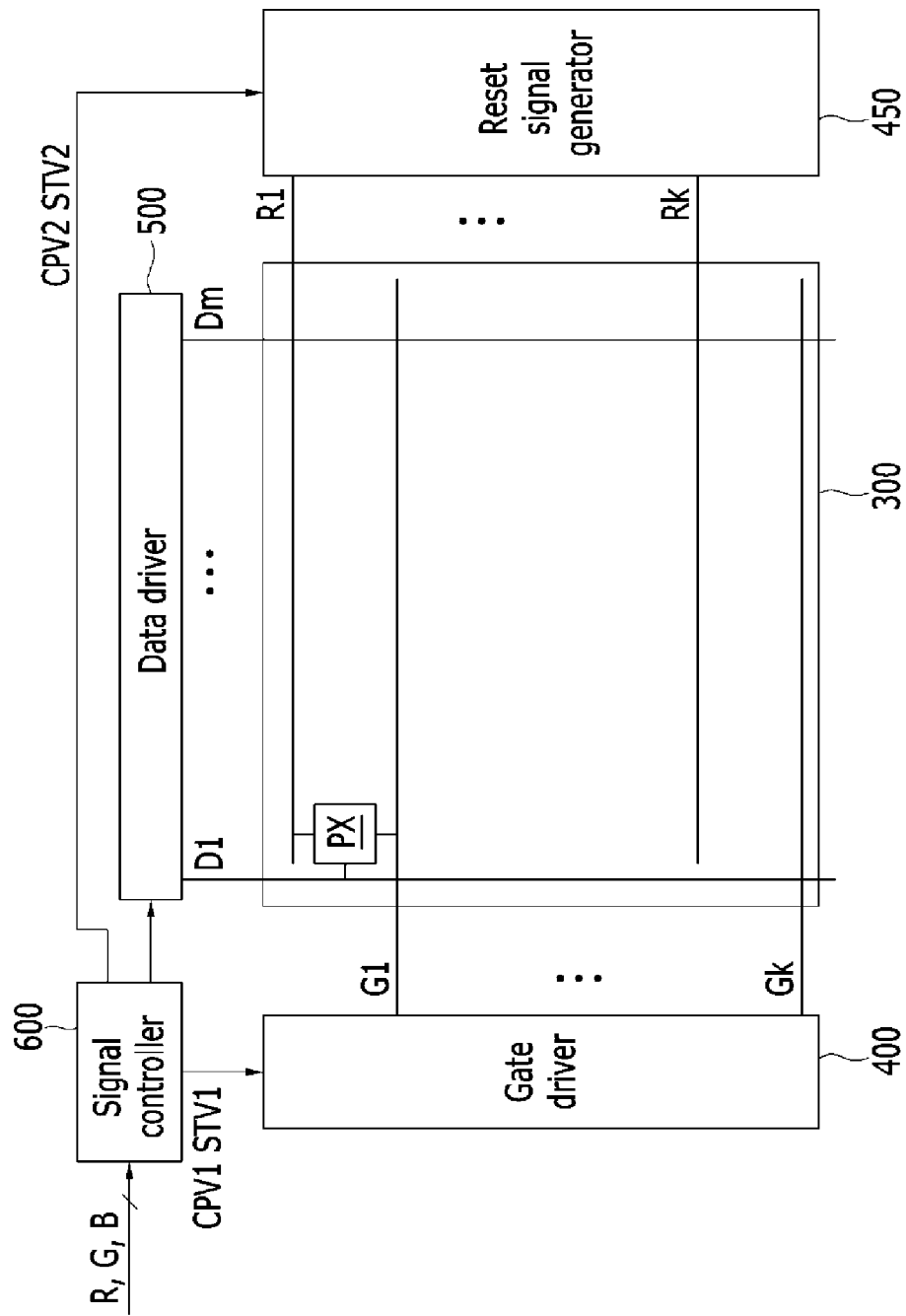
FIG. 1 is a block diagram of an electrowetting display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on the other element or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Now, an electrowetting display device according to an exemplary embodiment of the present invention will be described with reference to accompanying drawings.

Firstly, a display device according to an exemplary embodiment of the present invention will be described with reference to FIG. 1.

FIG. 1 is a block diagram of an electrowetting display device according to an exemplary embodiment of the present invention.

Referring to FIG. 1, an electrowetting display device according to an exemplary embodiment of the present invention includes a display panel 300, a gate driver 400, a reset signal generator 450, a data driver 500 connected thereto, and a signal controller 600 to control the other elements.

The display panel 300 includes a plurality of display signal lines G1-Gk, D1-Dm, and R1-Rk, and a plurality of pixels PX connected thereto and arranged in a substantially matrix shape.

Figure 2:
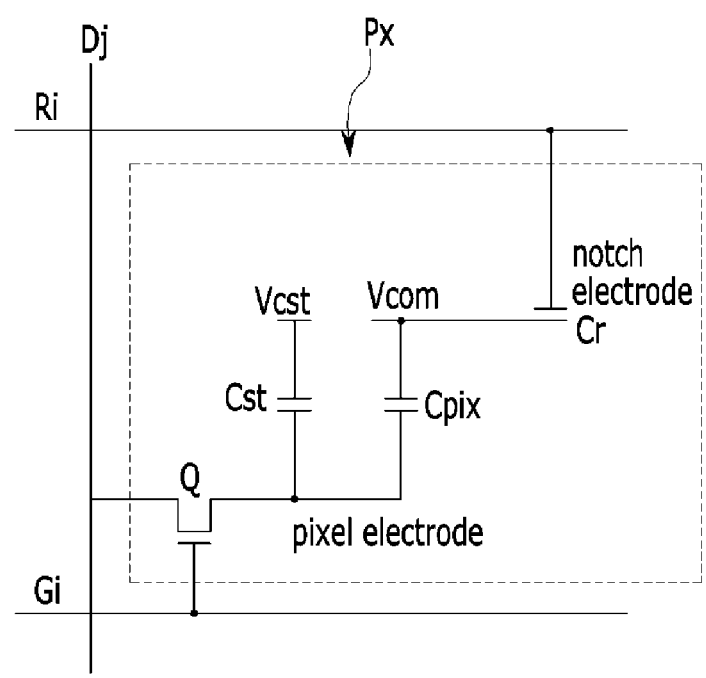
FIG. 2 is a circuit diagram of one pixel of an electrowetting display device according to an exemplary embodiment of the present invention.

The display signal lines G1-Gk, D1-Dm, and R1-Rk include a plurality of gate lines G1-Gk each of which to transmit a gate signal, a plurality of data lines D1-Dm each of which to transmit a data voltage, and a plurality of reset signal lines R1-Rk each of which to transmit a reset signal. Each of the reset signal lines R1-Rk are connected to a notch electrode as illustrated in FIG. 2.

The gate driver 400 is connected to the scanning lines G1-Gk to apply scanning signals, which include a combination of a gate-on voltage Von to turn on the switching element and a gate-off voltage Voff to turn off the switching element to the scanning lines G1-Gk. Here, the gate-on voltage Von is sequentially applied to the gate lines G1-Gk.

The data driver 500 is connected to the data lines D1-Dm of the display panel 300 to apply the data voltage to the data lines D1-Dm.

The reset signal generator 450 is connected to the reset signal lines R1-Rk to apply a reset signal to maintain a state of the water and the oil in the pixel of the electrowetting display device so that the water and the oil do not backflow. The reset signal swings between a high voltage and a low voltage. Also, the low voltage is applied during most of the time of one frame and the high voltage is applied at a reset time. According to an exemplary embodiment of the invention shown in FIG. 6, the high voltage is applied just before the gate-on voltage Von is applied to the pixel connected to the reset signal line.

The signal controller 600 controls the operation of the gate driver 400, the reset signal generator 450, and the data driver 500. Particularly, the gate driver 400 is controlled by receiving the first start signal STV1 and the first clock signal CPV1 from the signal controller 600, and the reset signal generator 450 is controlled by receiving the second start signal STV2 and the second clock signal CPV2.

FIG. 2 shows a pixel PX structure of the electrowetting display device. Specifically, FIG. 2 is a circuit diagram of a pixel in an electrowetting display device according to an exemplary embodiment of the present invention.

Each pixel PX includes a switching element Q connected to the gate lines G1-Gk and the data lines D1-Dm, and a pixel circuit connected thereto.

The switching element Q, which is a three terminal element such as a thin film transistor, includes a control terminal connected to one of the gate lines G1-Gk, an input terminal connected to one of the data lines D1-Dm, and an output terminal connected to the respective pixel electrode.

The pixel electrode forms a storage capacitance capacitor Cst with a storage electrode applied with a storage voltage Vcst, and forms a pixel capacitor Cpix with a common electrode applied with a common voltage Vcom.

Meanwhile, one of the reset signal lines R1-Rk is connected to a notch electrode of each pixel PX. The notch electrode forms a reset capacitor Cr with the common electrode.

Hereinafter, a structure of an electrowetting display device according to an exemplary embodiment of the present invention will be described with reference to FIG. 3, FIG. 4 and FIG. 5.

Figure 3:
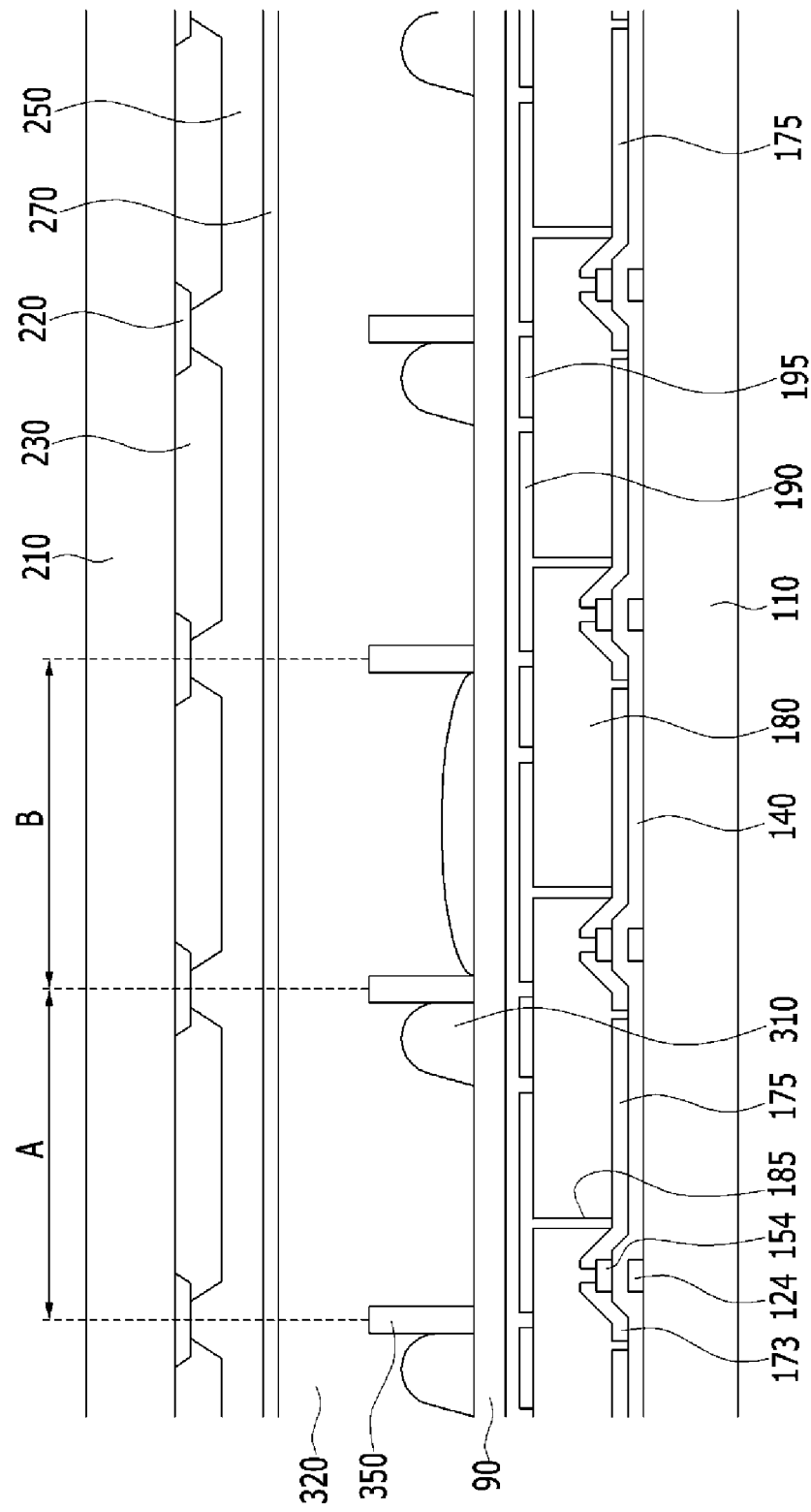
FIG. 3 is a cross-sectional view of an electrowetting display device according to an exemplary embodiment of the present invention.
Figure 4:
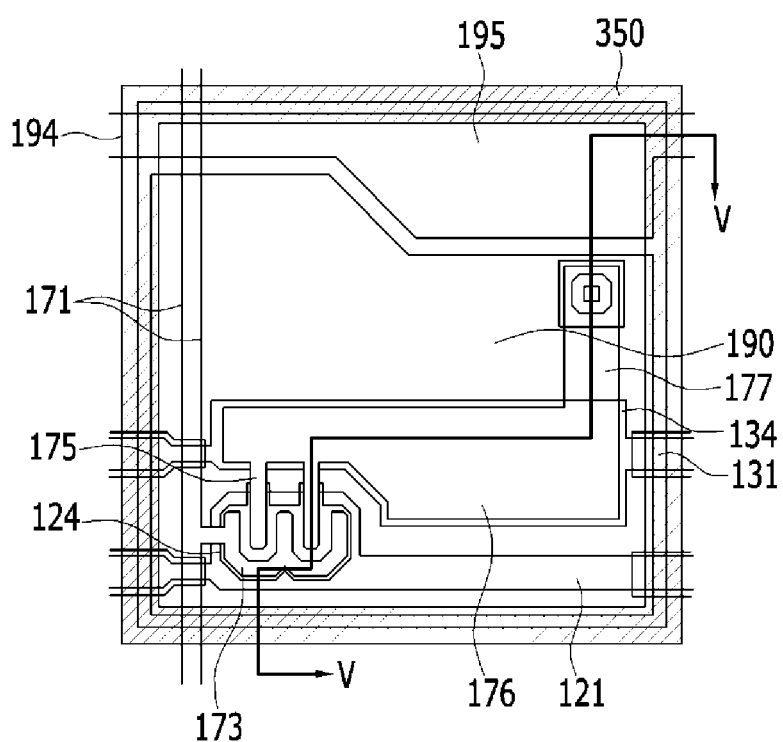
FIG. 4 is a layout view of one pixel of an electrowetting display device according to an exemplary embodiment of the present invention.
Figure 5:
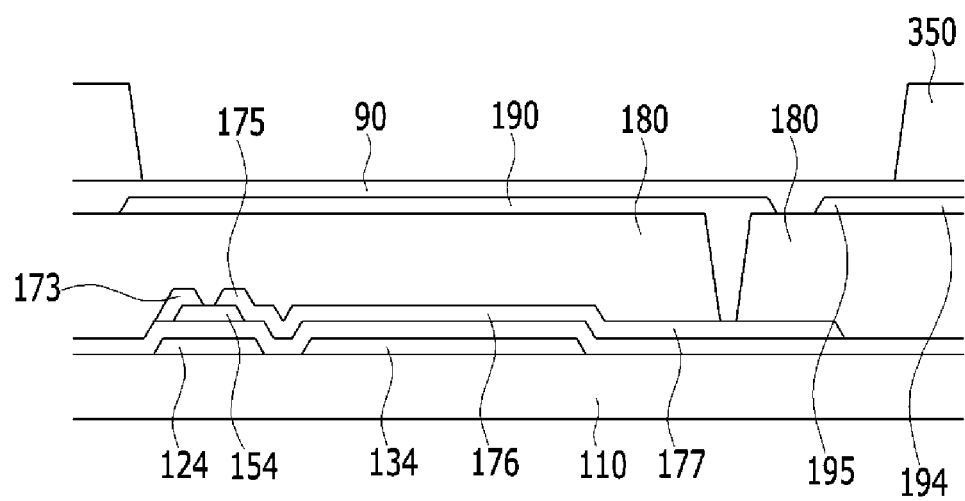
FIG. 5 is a cross-sectional view of the pixel of FIG. 4.

FIG. 3 is an overall cross-sectional view of an electrowetting display device, and FIG. 4 and FIG. 5 show a structure of a lower substrate in one pixel PX.

Firstly, the entire structure will be described through FIG. 3.

FIG. 3 is a cross-sectional view of an electrowetting display device according to an exemplary embodiment of the present invention.

As shown in FIG. 3, an electrowetting display device according to an exemplary embodiment of the present invention includes a lower substrate 110 formed with a pixel electrode 190, an upper substrate 210 facing the lower substrate 110 and formed with a common electrode 270, and electro-optic layers 310 and 320 positioned between the lower substrate 110 and the upper substrate 210. While the electrowetting display device in FIG. 3 illustrates a structure of a transmissive electrowetting display device, the inventive concept may also be applied to a reflective electrowetting display device. The lower substrate 110 includes partitions 350 forming a plurality of openings, and the electro-optic layers 310 and 320 include a black oil layer 310 disposed inside the openings of the partition 350 and an aqueous solution layer 320 disposed between the black oil layer 310 and the common electrode 270.

The lower substrate 110 and the upper substrate 210 may be flexible substrates made of glass, plastic, or glass fiber reinforced plastic (FRP).

Gate electrodes 124 are formed on the lower substrate 110. The gate electrodes 124 are connected to a plurality of gate lines extending in a certain direction. A gate insulating layer 140 made of silicon nitride (SiNx) is disposed on the gate lines and the gate electrodes 124.

A semiconductor layer 154 made of hydrogenated amorphous silicon is disposed on the gate insulating layer 140. The semiconductor layer 154 forms a channel of the thin film transistor. A data line and a drain electrode 175 are disposed on the gate insulating layer 140 and the semiconductor layer 154. The data line extends in a direction perpendicular to the gate line thereby crossing the gate line, and a branch extending from the data line constitutes a source electrode 173. At least portions of a pair of a source electrode 173 and a drain electrode 175 are positioned on the semiconductor layer 154, and they are spaced apart from each other and are opposite to each other with respect to the gate electrode 124.

Ohmic contacts are made between the semiconductor layer 154, and the source electrode 173 and the drain electrode 175, thereby reducing contact resistance therebetween.

A passivation layer 180 made of an insulating material such as silicon oxide, silicon nitride, or an organic material is disposed on the source electrode 173, the drain electrode 175, the semiconductor layer 154, and the gate insulating layer 140.

The pixel electrodes 190 made of a transparent conductive material such as ITO (indium tin oxide) or IZO (indium zinc oxide) are disposed on the passivation layer 180.

The passivation layer 180 has a contact hole 185 exposing the drain electrode 175. The pixel electrode 190 is physically and electrically connected to the drain electrode 175 through the contact hole 185. The notch electrode 195 is connected to another notch electrode 195 of a neighboring pixel in a direction that the gate line extends.

A water-repellent layer 90 is disposed on the pixel electrode 190 and the notch electrode 195, and the water-repellent layer 90 is formed of an insulating material having hydrophobicity.

The partitions 350 are disposed on the water-repellent layer 90. The partitions 350 are disposed in a matrix shape having openings that define pixel areas, and may be made of an organic layer including a black dye.

The black oil layer 310 is formed in the opening.

Meanwhile, a black matrix 220 having openings is disposed under the upper substrate 210, and color filters 230 are disposed in the openings of the black matrix 220. The color filter 230 includes a pigment to transmit only a certain wavelength. The color filter 230 may be made of a quantum dot (semiconductor nanocrystal) material. The quantum dot material as the semiconductor material having a crystalline structure with a size of several nanometers includes several hundred to several thousand atoms, and the size thereof is very small such that a surface for a unit volume is wide and a quantum confinement effect appears. Accordingly, unique physical and chemical characteristics that are different from the corresponding original characteristics of the semiconductor material appear.

For color display, each pixel PX may uniquely represent one of primary colors (i.e., spatial division), or each pixel PX may sequentially represent the primary colors one by one (i.e., temporal division), such that a spatial or temporal sum of the primary colors is recognized as a desired color. An example of a set of the primary colors includes red, green, and blue colors.

A planarizing layer 250 is disposed under the color filter 230 and the black matrix 220, and the common electrode 270 is disposed under the planarizing layer 250.

Meanwhile, the aqueous solution layer 320 is disposed between the partition 350 and the black oil layer 310, and the common electrode 270.

Surface tension of the aqueous solution layer 320 is not changed in the pixel B in which an electric field is not exerted between the pixel electrode 190 and the common electrode 270 such that the black oil layer 310 covers the entire corresponding pixel B. Accordingly, the light incident from a lower side is not emitted to an upper side, and thus black color is displayed.

Meanwhile, the surface tension of the aqueous solution layer 320 is changed in the pixel A in which an electric field is exerted between the pixel electrode 190 and the common electrode 270 such that the black oil layer 310 is accumulated together, thereby opening the corresponding pixel A. Accordingly, the light incident from the lower side is emitted to the upper side such that the pixel A displays a color corresponding to the color filter 230.

In an exemplary embodiment, the color filter 230 may be omitted, and when the flat panel display according to the present invention does not include the color filter 230, the pixel A displays white such that the flat panel display may be used as a black and white display device.

Hereinafter, the structure of the lower substrate in a pixel PX will be described with reference to FIG. 4 and FIG. 5.

FIG. 4 is a layout view of a pixel of an electrowetting display device according to an exemplary embodiment of the present invention, and FIG. 5 is a cross-sectional view of the pixel of FIG. 4.

A plurality of gate lines 121 and a plurality of storage electrode lines 131 extending in a certain direction (a transverse direction) are formed on the lower substrate 110. Each gate line 121 includes a gate electrode 124 protruding upward, and each storage electrode line 131 include a storage electrode 134 having a wide width. Also, a portion of the gate line 121 and the storage electrode line 131 overlapping the data line has a narrow width.

The gate insulating layer 140 made of silicon nitride (SiNx) is disposed on the gate lines 121 and the storage electrode lines 131.

The semiconductor layer 154 made of hydrogenated amorphous silicon is disposed on the gate insulating layer 140.

A data line 171 and the drain electrode 175 are disposed on the gate insulating layer 140 and the semiconductor layer 154. The data line 171 extends in a direction (a longitudinal direction) perpendicular to the gate line 121 thereby crossing the gate line 121, and the storage electrode line 131 and a branch extending from each data line 171 constitute the source electrode 173. The drain electrode 175 has an extension 176 that extends and overlaps the storage electrode 134, and a pixel electrode connection 177 that extends from a side of the extension 176 and electrically connected to the pixel electrode 190. The expansion 176 constitutes a storage capacitance capacitor Cst with the storage electrode 134.

At least portions of a pair of a source electrode 173 and a drain electrode 175 are positioned on the semiconductor layer 154, and they are spaced apart from each other and are opposite to each other with respect to the gate electrode 124. In the exemplary embodiment described with reference to FIG. 4, a structure in which two source electrodes 173 and two drain electrodes 175 are formed in a pair is shown. Ohmic contacts (not shown) are made between the semiconductor layer 154, and the source electrode 173 and the drain electrode 175, thereby reducing contact resistance therebetween.

The passivation layer 180 made of an insulating material such as silicon oxide, silicon nitride, or an organic material is disposed on the source electrode 173, the drain electrode 175, the semiconductor layer 154, and the gate insulating layer 140.

The pixel electrode 190 and the notch electrode 195 made of a transparent conductive material such as ITO (indium tin oxide) or IZO (indium zinc oxide) are disposed on the passivation layer 180.

The passivation layer 180 has the contact hole 185 exposing the pixel electrode connection 177 of the drain electrode 175. The pixel electrode 190 is physically and electrically connected to the drain electrode 175 through the contact hole 185.

The notch electrode 195 has a connection 194 extending in the horizontal direction that the gate line extends to be electrically connected to the notch electrode 195 of the neighboring pixel. That is, the connection direction of the notch electrode 195 is the same as the extending direction of the gate line 121 or the storage electrode line 131. The notch electrode 195 and the connection 194 constitute a reset signal line. The connection 194 of the electrowetting notch electrode 195 is formed with the same material as the notch electrode 195 and the pixel electrode 190. In the connection 194 of the notch electrode 195 shown in FIG. 4, the width of the portion overlapping the data line 171 is the same as that of other portions, however according to an exemplary embodiment, the width of the portion overlapping the data line 171 may be reduced like the gate line 121 and the storage electrode line 131.

The pixel electrode 190 and the notch electrode 195 according to the present exemplary embodiment are separated by a constant interval, and according to FIG. 4, the width of the notch electrode 195 is gradually increased closer to the right side after the constant width, and then the width is again constant, and the width of the pixel electrode 190 is decreased after being constant and then again becomes constant. The structure of the notch electrode 195 extends the width of the corner for the black oil layer 310 to be opened toward one corner (a right upper corner in FIG. 4) in the pixel area defined by the partition 350. That is, the notch electrode has the wide width near one corner of the pixel area defined by the partition. According to an exemplary embodiment, the notch electrode 195 may have a structure such that the width is gradually increased closer to the right side following a curved line.

The notch electrode 195 and the pixel electrode 190 are separated with the constant interval and are electrically isolated.

The water-repellent layer 90 is disposed on the pixel electrode 190 and the notch electrode 195, and the partitions 350 are disposed on the water-repellent layer 90.

Although not shown in the drawing, the black matrix 220 is disposed to cover a portion that is unnecessary for the image display, and may be formed to cover the partition 350, the notch electrode 195, and the interval between the pixel electrode 190 and the notch electrode 195. As a result, the opening of the black matrix 220 may be narrower than the opening of the partition 350.

Hereinafter, a reset operation by a gate signal and a reset signal applied to an electrowetting display device according to an exemplary embodiment of the present invention will be described with reference to FIG. 6, FIG. 7, FIG. 8, FIG. 9, and FIG. 10.

Figure 6:
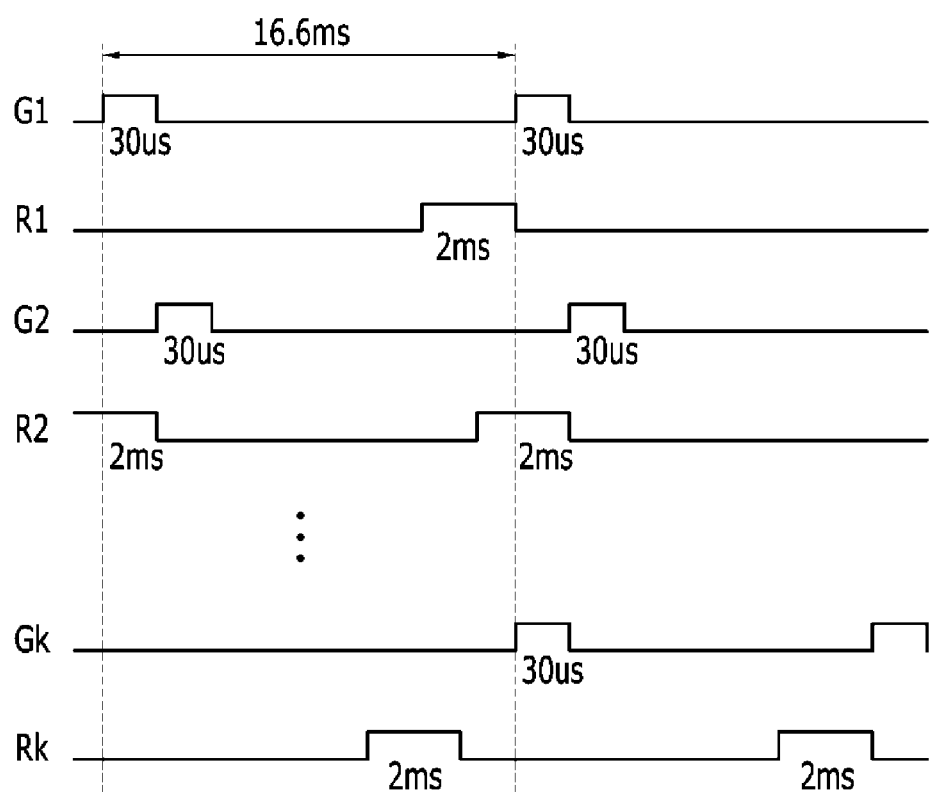
FIG. 6 is a waveform diagram of a gate signal and a reset signal applied to an electrowetting display device according to an exemplary embodiment of the present invention.

FIG. 6 is a waveform diagram of a gate signal and a reset signal applied to an electrowetting display device according to an exemplary embodiment of the present invention, and FIG. 7, FIG. 8, FIG. 9, and FIG. 10 are cross-sectional views of the electrowetting display device showing an operation of an oil layer according to a voltage applied in a pixel of the electrowetting display device according to the exemplary embodiment of the present invention.

Firstly, application timing of the gate signal and the reset signal applied to the gate lines G1-Gk and the reset signal lines R1-Rk of the electrowetting display device according to an exemplary embodiment of the present invention will be described with reference to FIG. 6.

Each gate line is sequentially applied with a gate-on voltage Von. When the gate-on voltage Von is changed into the gate-off voltage after the gate-on voltage Von is applied to the previous gate line, the gate-on voltage Von starts to be applied to the gate line of the next stage. One frame is formed from a point of time that the gate-on voltage Von starts to be applied to the first gate line G1 to the point of time that the application of the gate-on voltage Von to the last gate line Gk is finished. In the present exemplary embodiment, the gate-on voltage Von has a voltage of about 20V, and the gate-off voltage has a voltage of about −20V. Also, the gate-on voltage Von is maintained for about 30 μs.

Meanwhile, a reset signal is applied to each reset signal line, and the reset signal is transmitted to the notch electrode 195 of each pixel PX. The reset signal swings between a high voltage (referred to as "a reset voltage") and a low voltage. For the reset signal, the low voltage is applied during most of the time of one frame and the high voltage is applied at the reset time, and in the exemplary embodiment of FIG. 6, the high voltage is applied just before the gate-on voltage Von is applied. In the present exemplary embodiment, the high voltage of the reset signal may be 15V, and the low voltage may be −15V. Also, the high voltage of the reset signal is maintained for 2 ms in the present exemplary embodiment. However in another exemplary embodiment, it may be maintained for more than 0.5 ms and less than 2 ms. As a result, a period in which the high voltage of the reset signals overlaps each other may exist, which is different from the gate-on voltage Von.

Meanwhile, in the present exemplary embodiment, the common voltage Vcom may be the voltage of +15V, and the data voltage applied to the pixel electrode 190 may be more than −15V to less than 15V. That is, in the present exemplary embodiment, the reset signal and the data voltage have the same range. However, the reset signal has either the high voltage or the low voltage, whereas the data voltage has different voltage value according to gray level.

In the exemplary embodiment thus described, the operation of the black oil layer 310 according to the application of the reset voltage (the high voltage of the reset signal) will be described with reference to FIG. 7, FIG. 8, FIG. 9, and FIG. 10.

Figure 7:
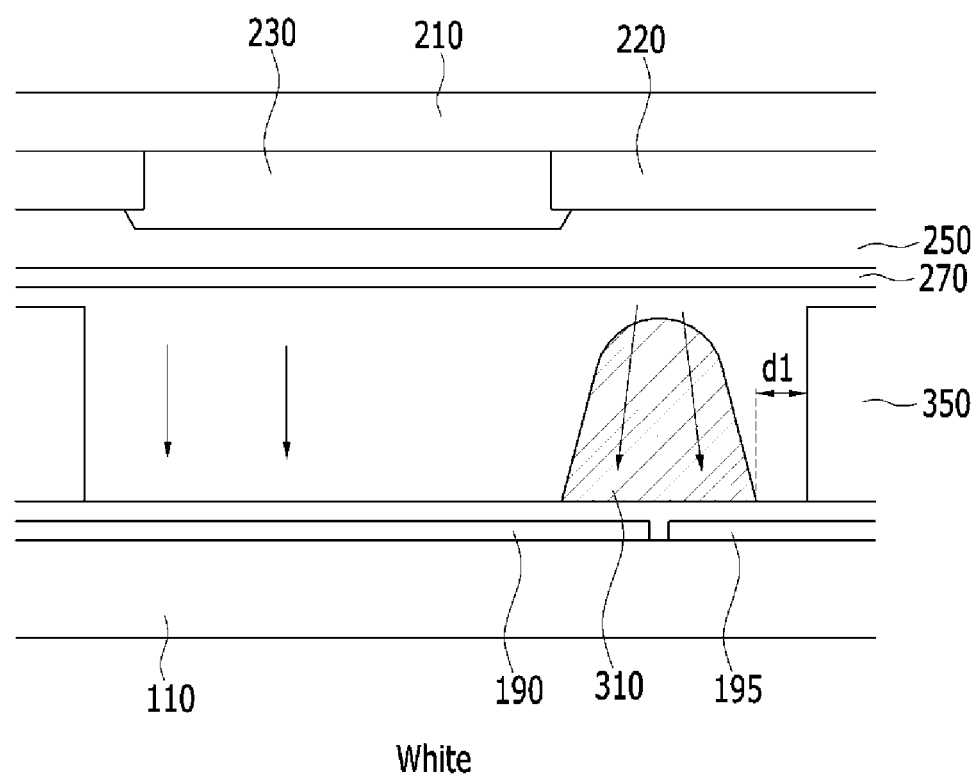
FIG. 7, FIG. 8, FIG. 9, and FIG. 10 are views showing an operation of an oil layer according to a voltage applied in one pixel of an electrowetting display device according to an exemplary embodiment of the present invention.
Figure 8:
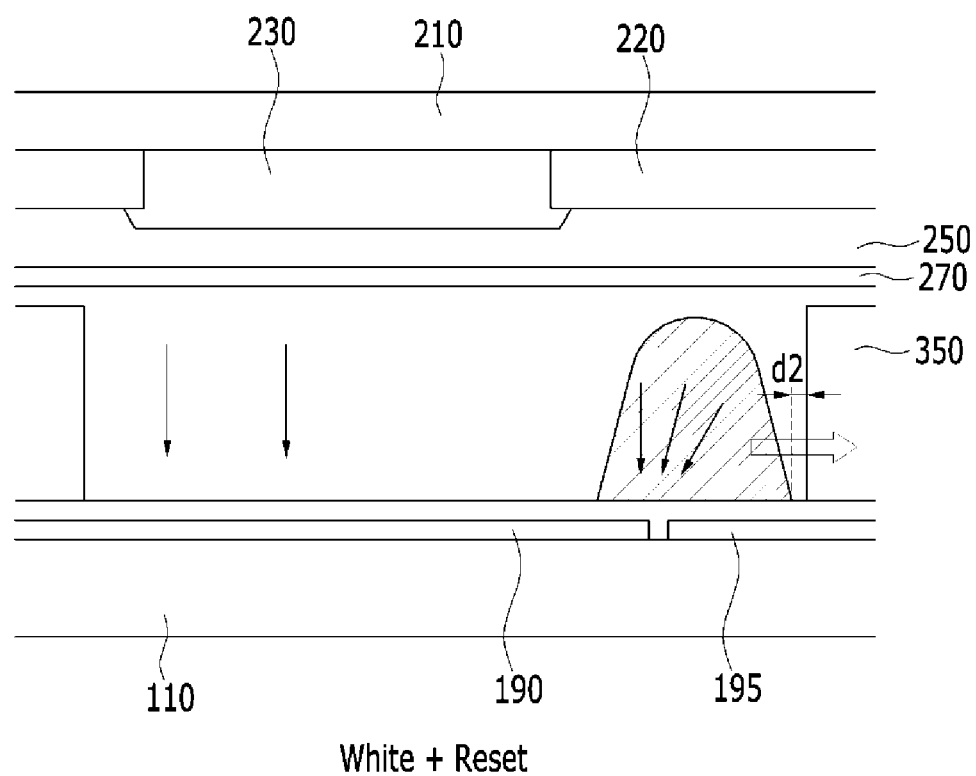

Firstly, FIG. 7 and FIG. 8 show the change in the shape of the black oil layer 310 when the pixel PX of the electrowetting display device displays white color and then the reset voltage is applied.

FIG. 7 shows the pixel PX of the electrowetting display device which displays white color. The common voltage Vocm applied to the common electrode 270 may be 15V, and the data voltage applied to the pixel electrode 190 may be −15V. At this time, the notch electrode 195 is applied with the low voltage (e.g., −15V) of the reset signal such that an electric field toward the pixel electrode 190 and the notch electrode 195 of the lower substrate from the common electrode 270 of the upper substrate is fully established on the pixel PX. However, the interval is formed between the pixel electrode 190 and the notch electrode 195 such that the electric field is divided with respect to the corresponding interval, thereby the black oil layer 310 is compressed and positioned with respect to the interval between the pixel electrode 190 and the notch electrode 195, and as a result, light emitted from a backlight (not shown) of the lower side is emitted to the upper side through the most region of the pixel electrode 190 to display white color. At this time, the black oil layer 310 may be positioned with the interval d1 for the partition 350. According to an exemplary embodiment, the black oil layer 310 is compressed and may be moved inside a boundary of the black matrix 220, and a portion of the black oil layer 310 may be positioned outside the black matrix 220.

When displaying white color as shown in FIG. 7, if the reset voltage is applied, the black oil layer 310 is moved as shown in FIG. 8.

In FIG. 8, differently from FIG. 7, +15V as the high voltage (the reset voltage) of the reset signal is applied to the notch electrode 195. Therefore, the electric field is not formed between the notch electrode 195 and the common electrode 270, and the electric field is weak on the notch electrode 195 such that the black oil layer 310 receives a force to move in the direction of the partition 350 of the side that the notch electrode 195 is formed. As a result, the black oil layer 310 is closer to the partition 350 than displaying the white color (as shown in FIG. 7) such that the interval d2 is formed. Also, while the black oil layer 310 that is compressed to display the white color does not decrease the opened portion of the pixel electrode 190, the black oil layer 310 receives a force to move in the direction of the partition 350 of the side that the notch electrode 195 is formed such that a backflow collapsing to the side of the pixel electrode 190 may be prevented. That is, the backflow is prevented by the application of the reset voltage such that the reset voltage may be applied at the center of the period until the application of the next gate-on voltage after the gate-on voltage is applied, differently from the timing of FIG. 6, according to an exemplary embodiment, so the reset voltage may be applied more than twice. That is, according to an exemplary embodiment, the reset voltage may be variously applied at the time to prevent the backflow.

The black oil layer 310 compressed in FIG. 7 and FIG. 8 may be positioned at one corner of the pixel area defined by the partition 350. This is the reason that the notch electrode 195 is widely formed in one corner of the pixel area.

Figure 9:
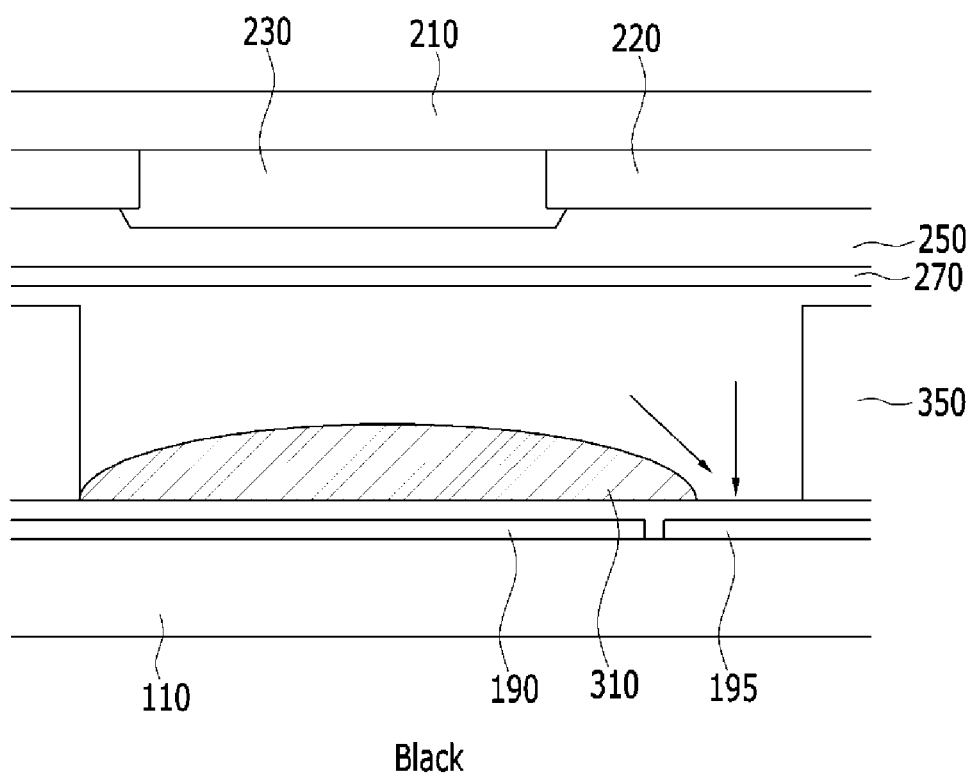
Figure 10:
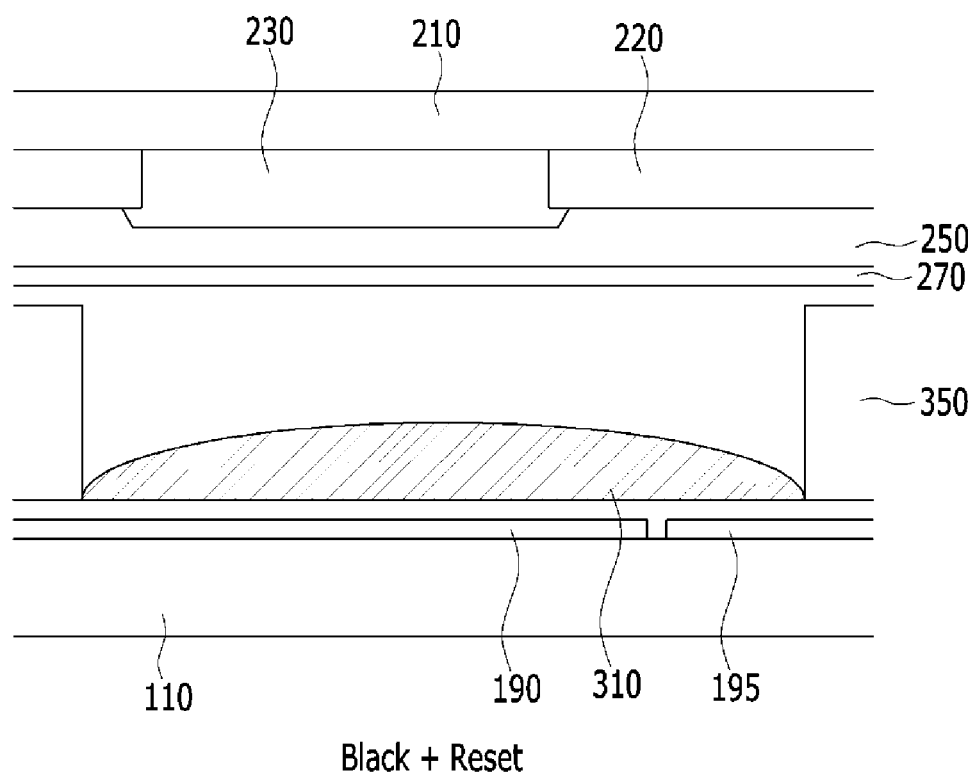

Meanwhile, when the pixel PX of the electrowetting display device displays the black color and then the reset voltage is applied, the movement of the black oil layer 310 is as respectively shown in FIG. 9 and FIG. 10.

FIG. 9 shows the pixel PX of the electrowetting display device which displays the black color. The common voltage Vocm applied to the common electrode 270 may be 15V, and the data voltage applied to the pixel electrode 190 may be +15V. At this time, the low voltage (-15V) of the reset signal is applied to the notch electrode 195 such that the electric field is not fully established on the pixel PX, however the electric field is only formed between the upper common electrode 270 and the lower notch electrode 195. As a result, the black oil layer 310 covers the pixel electrode 190 such that the light emitted from the backlight (not shown) is not emitted in the upper side, thereby displaying the black. The black oil layer 310 may be spaced apart from the partition 350 by the certain interval when displaying the black, and at this time, the black matrix 220 covers the corresponding portion to not generate the light leakage. Also, the interval between the black oil layer 310 and the partition 350 is formed on the notch electrode 195 by the electric field formed on the notch electrode 195.

When displaying the black color as shown in FIG. 9, if the reset voltage is applied, the black oil layer 310 is moved as shown in FIG. 10.

In FIG. 10, differently from FIG. 9, +15V as the high voltage (the reset voltage) of the reset signal is applied to the notch electrode 195. Therefore, the electric field is not established between the notch electrode 195 and the common electrode 270 such that the black oil layer 310 is fully spread between the partitions 350. Also, at this time, the black oil layer 310 receives the force which moves the black oil layer 310 in the direction of the partition 350 at the side that the notch electrode 195 is formed such that it may contact the partition 350. The black oil layer 310 still does not transmit the light such that the black color is equally displayed.

Hereinafter, a structure formed with each driver of the electrowetting display device according to an exemplary embodiment of the present invention will be described.

Figure 11:
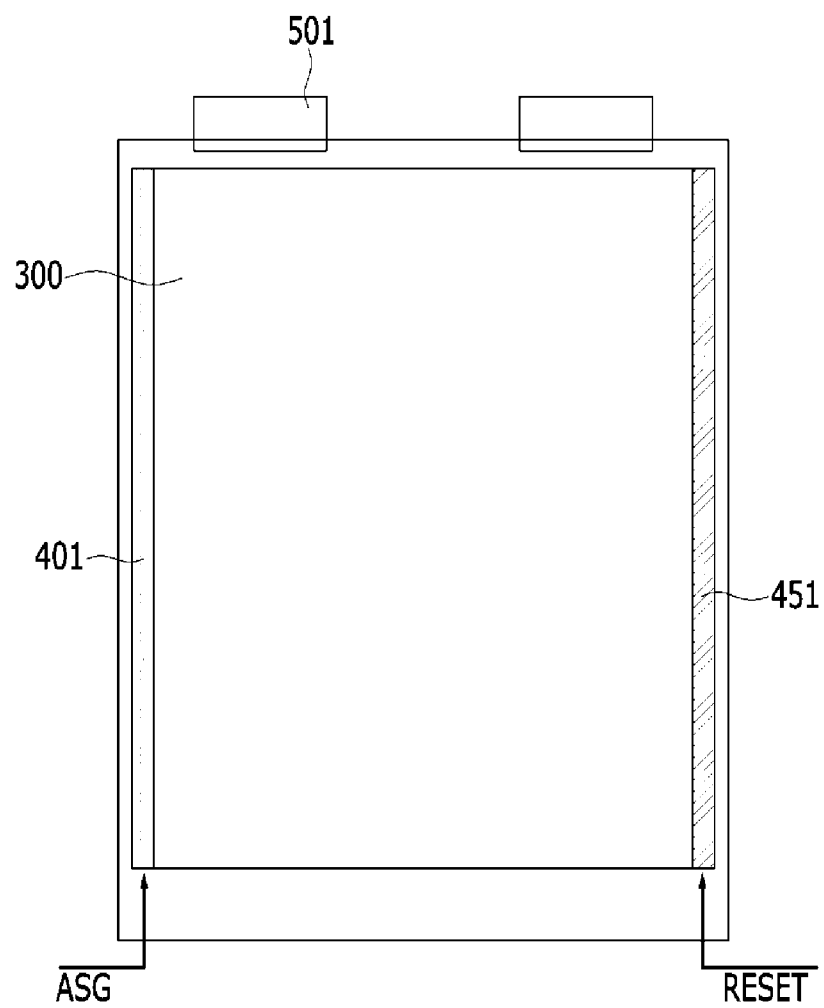
FIG. 11 and FIG. 12 are views showing a display panel, a gate driver, a data driver, and a reset signal generator in an electrowetting display device according to an exemplary embodiment of the present invention.
Figure 12:
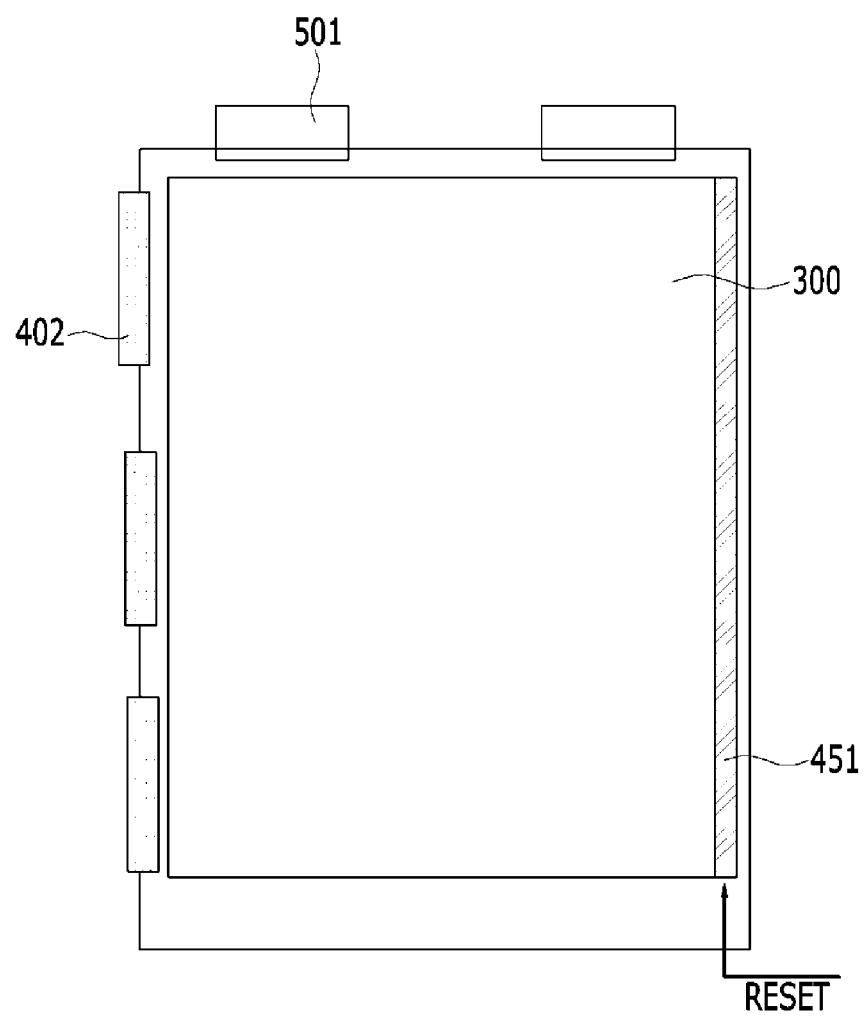

FIG. 11 and FIG. 12 are views showing a display panel, a gate driver, a data driver, and a reset signal generator in an electrowetting display device according to an exemplary embodiment of the present invention.

FIG. 11 shows a gate driver 401 that is deposited and patterned along with the gate line, the data line, the pixel electrode, and the notch electrode of the display panel 300 to be integrated with the substrate 110. ASG of FIG. 11 is an abbreviation for the amorphous silicon gate which is to be formed along with the wiring and the electrode of the display panel 300.

At this time, the reset signal generator 451 is also deposited and patterned along with the gate driver 401, the gate line, the data line, the pixel electrode, and the notch electrode to be integrated with the substrate 110. In FIG. 11 and FIG. 12, RESET means that the reset signal generator 451 receives a signal from the outside to generate the reset signal, and in the exemplary embodiment of FIG. 1, it means the second start signal STV2 and the second clock signal CPV2.

Meanwhile, the data driver 501 is attached to the display panel 300 with a chip state formed on a film or attached to the substrate 110.

Also, differently from FIG. 11, FIG. 12 shows a gate driver 402 which is formed with the chip shape formed on the film or attached to the substrate 110, and the reset signal generator 451 and the data driver 501 are the same as those of the exemplary embodiment of FIG. 11.

As well as the exemplary embodiments of FIG. 11 and FIG. 12, the reset signal generator 450 may also be formed with the chip shape formed on the film or attached to the substrate 110 like the gate driver 402 of FIG. 12. However, the reset signal applied by the reset signal generator 450 is similar to the pattern to apply the gate-on voltage such that the manufacturing cost may be further reduced when the reset signal generator 450 is deposited and patterned along with the gate line, the data line, and the pixel electrode, as shown in FIG. 11. Also, the reset signal generator to generate and apply the reset signal is disposed inside the electrowetting display device to reduce the need for the additional wiring to be formed at the outer part of the panel.

Hereinafter, a pixel structure of the electrowetting display device according to another exemplary embodiment of the present invention will be described.

Figure 13:
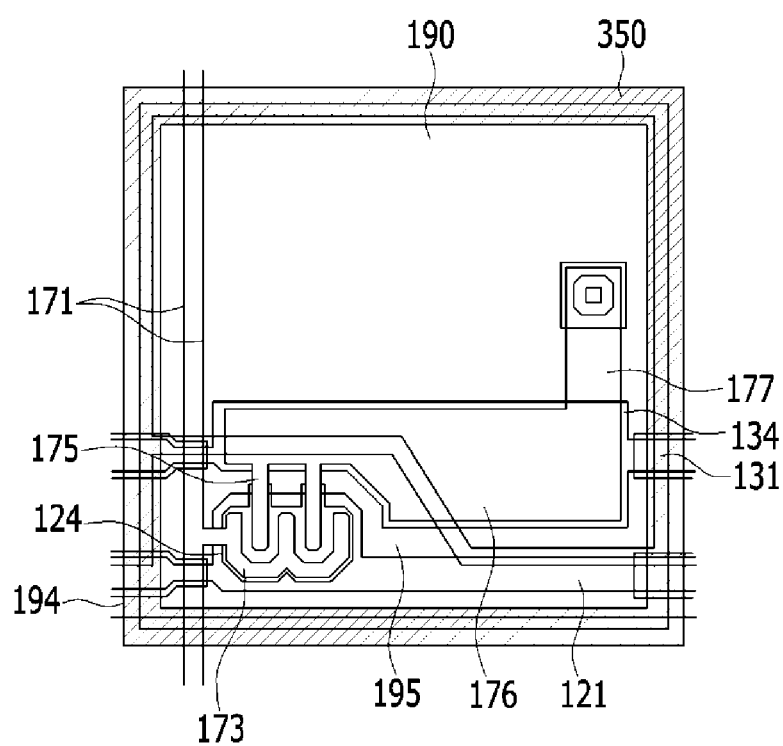
FIG. 13 is a layout view of one pixel in an electrowetting display device according to another exemplary embodiment of the present invention.

FIG. 13 is a layout view of a pixel in an electrowetting display device according to another exemplary embodiment of the present invention.

The pixel structure of FIG. 13 corresponds to the pixel structure of FIG. 4. The pixel structure shown in FIG. 13 has different pixel electrode 190 and the notch electrode 195 from those shown in FIG. 4.

That is, in FIG. 13, the wide portion of the notch electrode 195 is disposed near the left lower corner of the pixel area defined by the partition 350.

The notch electrode 195 has the connection 194 extending in the horizontal direction that the gate line extends, while partially overlapping the gate line 121 and the storage electrode line 131. That is, the notch electrode 195 is disposed on the thin film transistor (including the gate electrode, the source electrode, the drain electrode, and the channel portion of the semiconductor), such that the thin film transistor and the notch electrode 195 overlap each other.

In the connection 194 of the notch electrode 195 shown in FIG. 13, the width of the portion overlapping the data line 171 is the same as that of the other portion, and according to an exemplary embodiment, the width of the portion overlapping the data line 171 may be reduced like the gate line 121 and the storage electrode line 131.

The pixel electrode 190 and the notch electrode 195 according to the present exemplary embodiment are separated with the constant interval, as in FIG. 13. The notch electrode 195 has the structure in which the width is gradually decreased closer to the right side and then becomes again constant, whereas the pixel electrode 190 has the structure in which the constant width is gradually increased and then becomes constant again. In the structure of the notch electrode 195, the width of the corner is expanded for the black oil layer 310 to be opened toward one corner (the left lower corner in FIG. 13) in the pixel area divided by the partition 350. That is, the notch electrode has the wide width near one corner of the pixel area divided by the partition. According to an exemplary embodiment, the notch electrode 195 may have the structure in which the width is gradually decreased closer to the right side according to the curved line.

The notch electrode 195 and the pixel electrode 190 are separated by the certain interval, and are electrically isolated.

The black matrix 220 disposed on the upper substrate 210 generally covers the portion corresponding to the notch electrode 195, the gate line 121, and the storage electrode line 131, and in the exemplary embodiment of FIG. 13, the notch electrode 195 overlaps at least a portion of the gate line 121 and the storage electrode line 131 such that the opening of the black matrix 220 may be widely formed in comparison with the exemplary embodiment of FIG. 4. However, in the exemplary embodiment of FIG. 13, the gate line and the reset signal line overlap each other such that the gate voltage and the reset voltage may interfere with each other.

Accordingly, according to the characteristic of the panel, the exemplary embodiment of FIG. 4 or FIG. 13 may be used, and a structure in which the gate voltage and the reset voltage interfere with each other while increasing the aperture ratio may be provided.

Meanwhile, according to an exemplary embodiment, the color filter is not used and a corresponding color oil layer may be used instead of the black oil layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrowetting display device comprising:
    a lower substrate;
    a pixel electrode disposed on the lower substrate;
    a notch electrode spaced apart from the pixel electrode by an interval;
    a water-repellent layer covering the pixel electrode and the notch electrode;
    a partition disposed on the water-repellent layer;
    an oil layer disposed on the water-repellent layer between partitions;
    a reset signal line comprising the notch electrode and a connection between the notch electrode and an adjacent notch electrode;
    an upper substrate disposed on the lower substrate;
    a common electrode disposed between the lower substrate and the upper substrate;
    a reset signal generator connected to the reset signal line, wherein the reset signal generator is configured to generate and apply a reset signal to the notch electrode in the form of a voltage having a value that ranges between a high voltage and a low voltage, and wherein the value has a magnitude equal to a magnitude of a value of a voltage applied to the common electrode; and
    a gate driver connected to the pixel electrode and separate from the reset signal generator, wherein the gate driver is configured to supply a voltage to the pixel electrode having a value that ranges between the high voltage and the low voltage.

2. The electrowetting display device of claim 1, wherein the notch electrode has a width that is wider near one corner of a pixel area defined by the partition.

3. The electrowetting display device of claim 2, wherein the notch electrode is connected to a notch electrode of a neighboring pixel through the connection, and
    the connection comprises the same material as the notch electrode.

4. The electrowetting display device of claim 3, wherein a gate line is disposed between the lower substrate, and the pixel electrode and the notch electrode, and
    the gate line extends in a direction that corresponds to a direction in which the notch electrode is connected to the notch electrode of the neighboring electrode.

5. The electrowetting display device of claim 4, wherein the gate line, and the notch electrode and the connection, do not overlap each other.

6. The electrowetting display device of claim 4, wherein the gate line, and the notch electrode and the connection, overlap each other.

7. The electrowetting display device of claim 1, wherein the reset signal generator is manufactured along with the pixel electrode and the notch electrode to be integrated with the lower substrate.

8. The electrowetting display device of claim 1, wherein a black matrix is disposed between the upper substrate and the common electrode, and the black matrix covers the notch electrode, an interval between the pixel electrode and the notch electrode, and the partition.

9. A method of driving an electrowetting display device comprising a plurality of gate lines, a plurality of reset signal lines comprising notch electrodes and connections between the notch electrodes, a plurality of pixel electrodes connected to the plurality of gate lines and the plurality of reset signal lines, a plurality of partitions, a common electrode, and an oil layer, the method comprising:
    applying a reset signal by a reset signal generator to the plurality of reset signal lines; and
    applying a gate-on voltage by a gate driver to a gate line of the plurality of gate lines, wherein the gate driver is separate from the reset signal generator;
    wherein the reset signal varies between a first voltage and a second voltage that is higher than the first voltage,
    wherein the second voltage has a value that has a magnitude equal to a magnitude of a value of a voltage applied to the common electrode, and wherein the values of the first voltage and the second voltage are in a range that is equal to a range of values of voltage applied to the pixel electrodes.

10. The method of claim 9, wherein the first voltage of the reset signal is applied during most of one time frame, and the second voltage is applied at a time for resetting a pixel electrode, wherein a time frame is defined from (i) a first point of time that the gate-on voltage starts to be applied to a first gate line to (ii) a second point of time that application of the gate-on voltage to the last gate line is finished.

11. The method of claim 10, wherein the second voltage is applied just before the gate-on voltage is applied to the pixel electrode.

12. The method of claim 9, wherein when the second voltage is applied, the oil layer receives a force in a direction of the partition of a side where the notch electrode is disposed.

13. An electrowetting display device, comprising:
a plurality of gate lines;
a plurality of reset signal lines comprising notch electrodes and connections between notch electrodes;
a plurality of pixel electrodes connected to the plurality of gate lines and the plurality of reset signal lines;
a common electrode;
a plurality of partitions;
an oil layer;
a reset signal generator connected to the plurality of reset signal lines, wherein the reset signal generator is configured to generate and apply a reset signal to the reset signal lines in the form of a voltage having a value that ranges between a high voltage and a low voltage, and wherein the value has a magnitude equal to a magnitude of a value of voltage applied to the common electrode; and
a gate driver connected to the plurality of pixel electrodes and separate from the reset signal generator, wherein the gate driver is configured to supply a voltage to the pixel electrodes having a value that ranges between the high voltage and the low voltage.

14. The electrowetting display device of claim 13, wherein the low voltage of the reset signal is applied during most of one time frame, and the high voltage is applied at a time for resetting a pixel electrode, wherein a time frame is defined from (i) a first point of time that the gate-on voltage starts to be applied to a first gate line to (ii) a second point of time that application of the gate-on voltage to the last gate line is finished.

15. The electrowetting display device of claim 14, wherein the high voltage is applied just before the gate-on voltage is applied to the pixel electrode.

* * * * *